Nov. 10, 1931.  E. R. MAURER ET AL  1,831,360
TRUCK BODY CONSTRUCTION
Filed Dec. 10, 1928   6 Sheets-Sheet 3

INVENTORS
Edwin R. Maurer
Donald M. Ferguson
BY
ATTORNEYS

INVENTORS
Edwin R. Maurer
Donald M. Ferguson
BY
ATTORNEYS

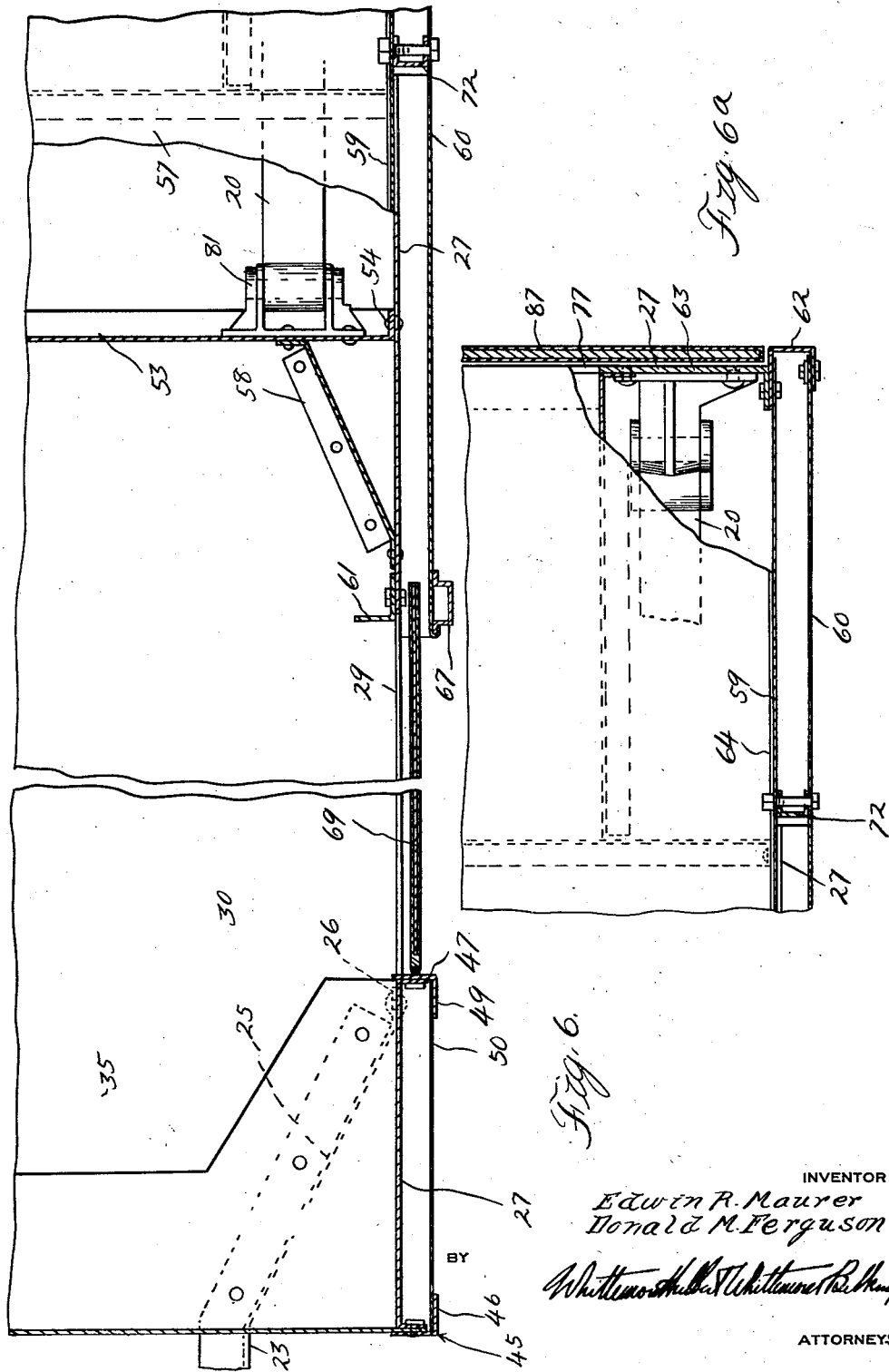

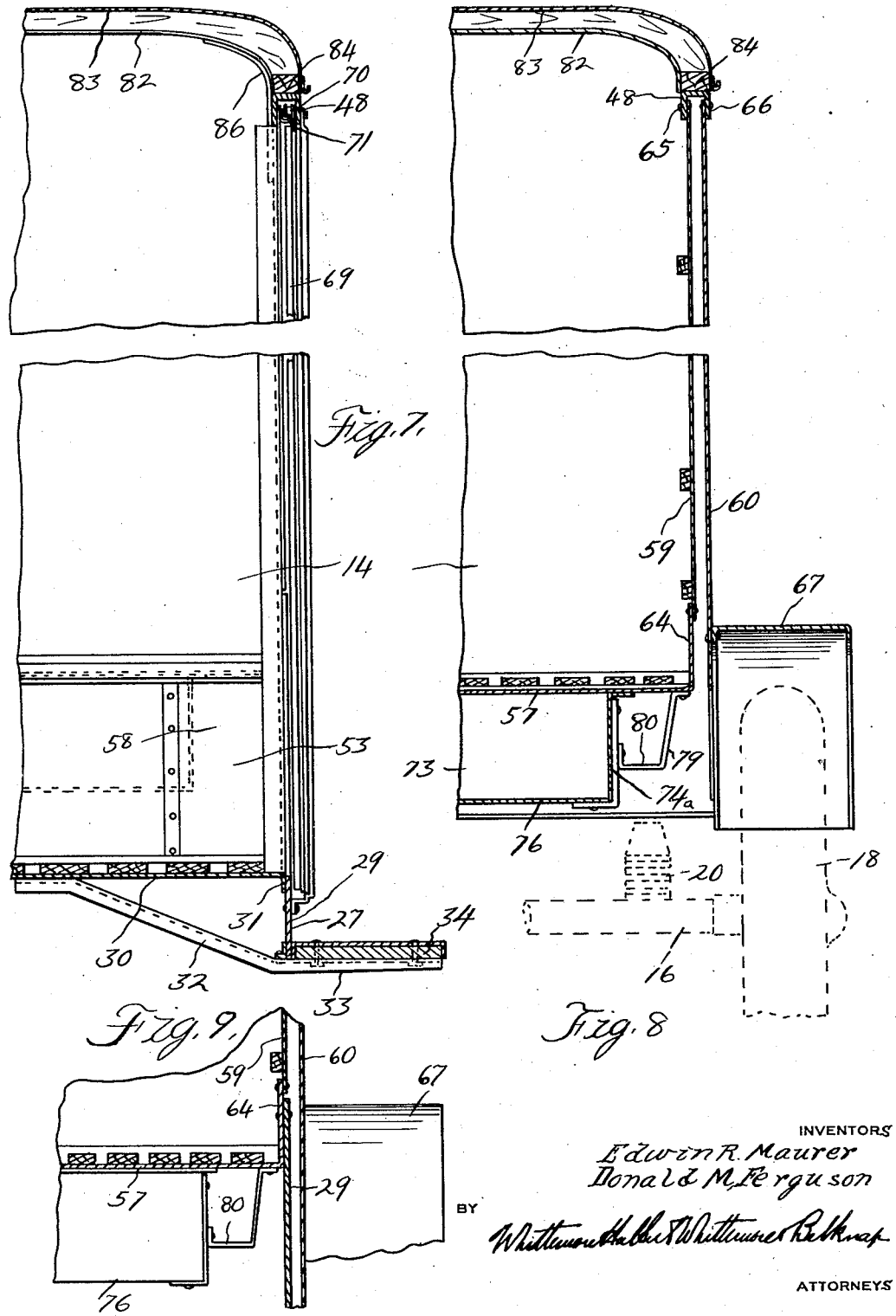

Patented Nov. 10, 1931

1,831,360

UNITED STATES PATENT OFFICE

EDWIN R. MAURER, OF DETROIT, AND DONALD M. FERGUSON, OF HIGHLAND PARK, MICHIGAN, ASSIGNORS TO DIVCO-DETROIT CORPORATION, OF DETROIT, MICHIGAN, A CORPORATION OF MICHIGAN

TRUCK BODY CONSTRUCTION

Application filed December 10, 1928. Serial No. 325,080.

This invention relates generally to motor vehicles designed to be used as delivery cars and has particular reference to the bodies for such vehicles.

The invention, while capable of many and diversified uses, finds particular utility for house to house route deliveries wherein the operator finds it necessary to enter and leave the vehicle at frequent intervals.

It is therefore one of the primary objects of this invention, to provide a body of the above type having a driver's compartment provided with a depressed floor portion located substantially below the floor level of the vehicle but above the running gear of the same so as to form an unobstructed transverse passage-way through the vehicle. An arrangement of this character permits the operator to stand erect within the driver's compartment and work the load in the storage chamber at substantially curb level from the compartment.

The invention provides for simplifying the method of manufacture and reducing the number of parts to a minimum by introducing a body constructed and designed to carry the loads of the vehicle without the assistance of the customary chassis frame.

Another novel feature of construction of this invention which contributes materially to simplifying the method of assembly is that the body may be built-up by bolting together a plurality of prefashioned assemblies, thus rendering it possible to readily remove certain parts of the body for repair or other reasons.

A further object of this invention is to provide a body having a storage compartment so designed as to be insulated to a certain extent from the temperature of the surrounding atmosphere. In other words with this invention it is possible to maintain a substantially uniform temperature within the storage compartment a comparatively long time so that perishable foods may be conveyed to their destination without any danger of the same becoming spoiled.

A still further object of the present invention is to provide a compartment beneath the storage chamber which in addition to bracing the flooring for this chamber, operates to completely house the usual spare tire.

Other objects and advantages of this invention are attributed to the peculiar construction of the body which will be made more apparent as this description proceeds especially when considered in connection with the accompanying drawings wherein:

Figures 6 and 6A are sectional views taken on the line 6—6 of Figure 1;

Figures 7 and 8 are transverse sectional views taken through the center and rear end of the body respectively; and Figure 9 is a sectional view taken on the line 9—9 of Figure 4.

Generally described, our improved delivery car comprises a motor compartment, driver's compartment, and storage chamber. The driver's compartment is provided with a transverse passage-way having an unobstructed floor portion positioned substantially below the floor of the storage chamber. This arrangement not only facilitates loading of the vehicle but also permits the operator to move about freely within the driver's compartment which is especially advantageous when the vehicle is used for house to house deliveries.

Figure 1:
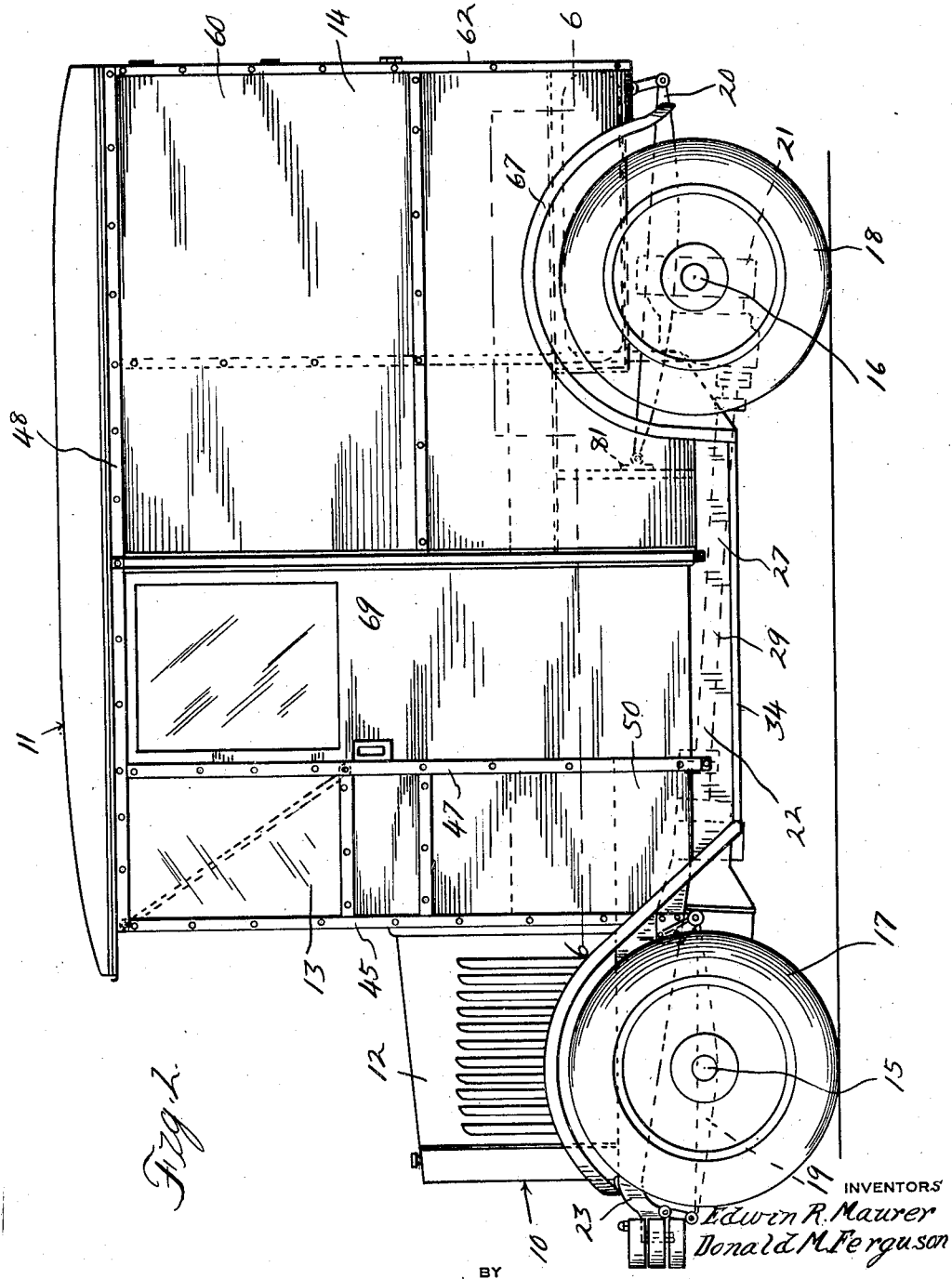
Figure 1 is a side elevation of a vehicle equipped with a body constructed and assembled in accordance with this invention.
Figure 2:
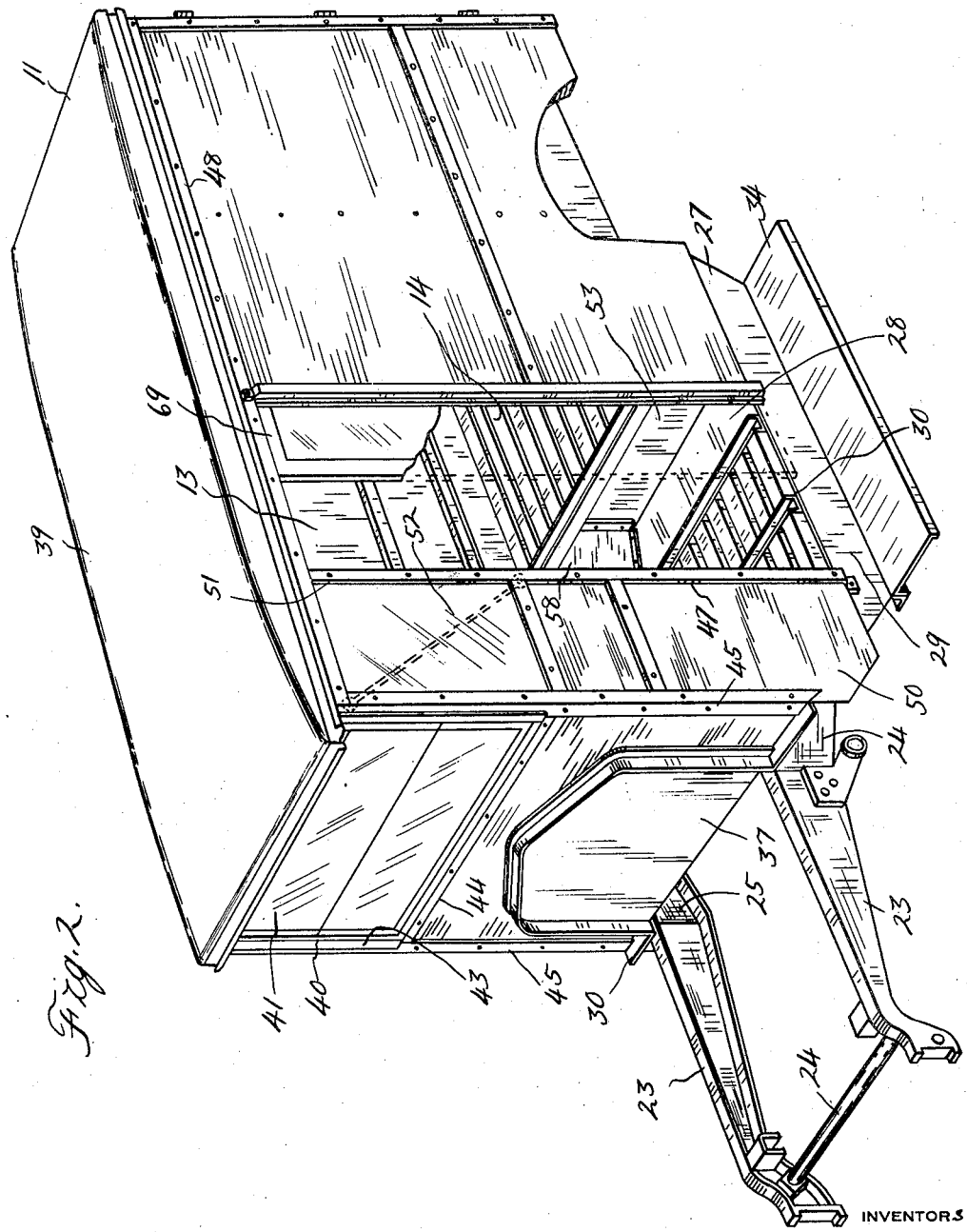
Figure 2 is a perspective view of the body illustrated in Figure 1 showing the front end construction thereof.
Figure 3:
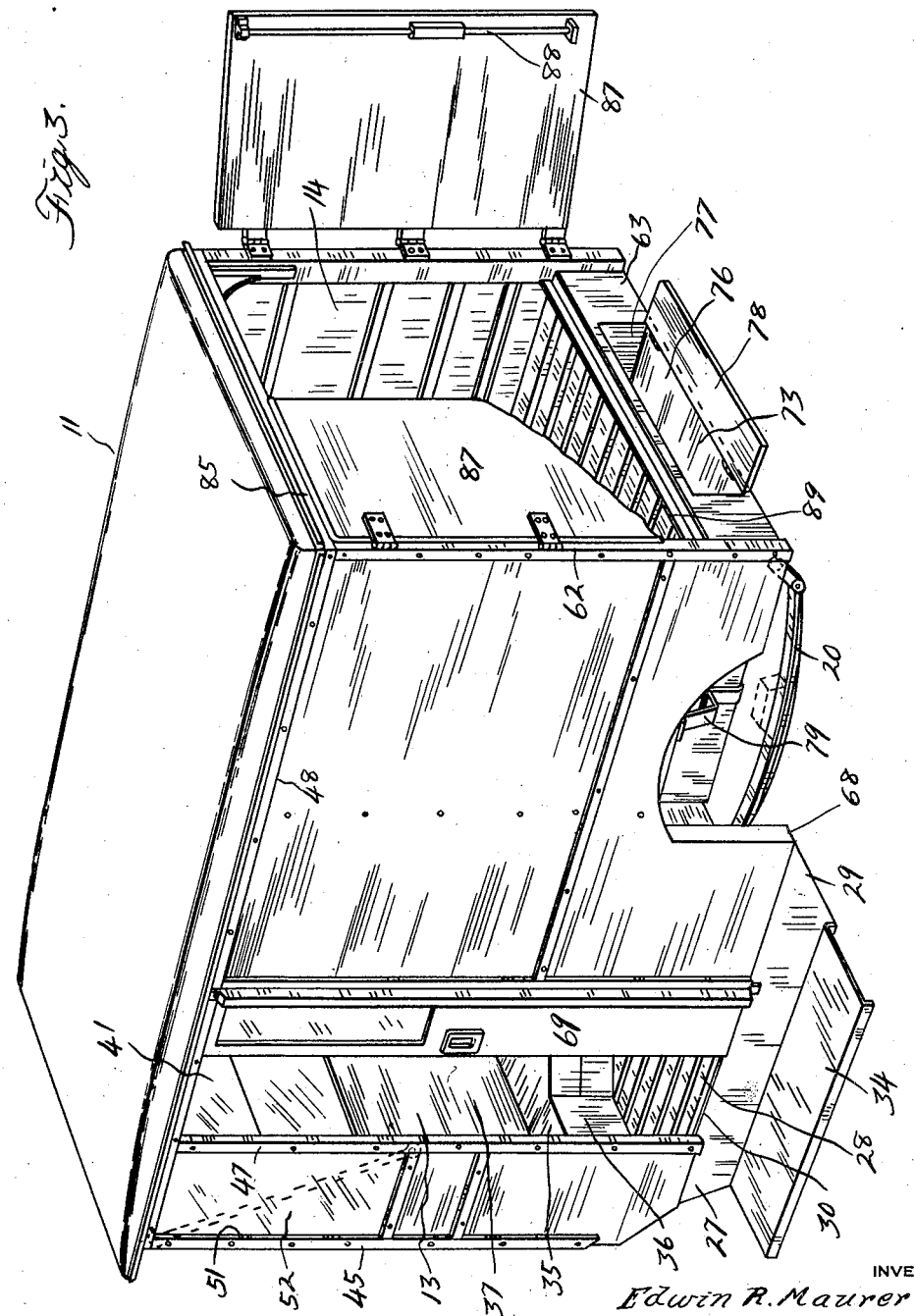
Figure 3 is a perspective view showing the rear end construction of the body.

The body of the vehicle is so designed as to carry substantially the entire load without the cooperation of the customary chassis frame. With this construction the usual longitudinally extending frame having a drop intermediate the ends for accommodating the depressed floor portion of the driver's compartment, is eliminated with the result that the body may be more economically manufactured. However, while the conventional sill members are eliminated in the present construction, a pair of auxiliary sill members or supports are employed and, as shown in Figure 2 are secured to the body in advance of the driver's compartment for supporting the motor (not shown) but which is preferably of the vertical multi-cylinder type. The propeller shaft, establishing a connection between the motor and rear axle, extends substantially below the depressed floor portion of the driver's compartment so as not to project into the same and unobstruct the passage therethrough.

The sides and top of the body are formed of double panels having an air pocket therebetween which serves to insulate to a certain extent the interior of the body from the temperature of the surrounding atmosphere. The air pocket between the rear quarter panels in addition to performing the above function, also constitutes a chamber for accommodating the sliding doors for the driver's compartment.

Referring now more in detail to the foregoing construction it will be noted that there is illustrated in the drawings, a vehicle 10 having a body 11 provided with a motor compartment 12, driver's compartment 13 and a storage chamber 14. The running gear for the vehicle is substantially of conventional design and comprises the front and rear axles 15 and 16 respectively carrying at the outer ends thereof, the steering wheels and driving wheels 17 and 18 respectively. The body 10 is yieldably supported upon the axles by means of the front and rear springs 19 and 20. The particular manner in which the same are mounted upon the body will be more fully hereinafter described. The rear wheels 18 are preferably driven by means of a suitable differential illustrated generally at 21 and operatively connected to the motor (not shown) of the vehicle by means of a propeller shaft 22.

The motor (not shown) is preferably carried by a pair of supports or sill members 23 secured together at the forward end thereof by means of a tie bar 24 and terminating at the rear ends in outwardly flared portions 25 having flanges 26 secured to a pair of side plates 27. In this connection it will be noted that inasmuch as both sides of the body are identical, only one side is illustrated herein in detail. The plates 27 are of relatively thick gauge metal and extend rearwardly from a point intermediate the ends of the sill members 23 to substantially mid-way of the storage compartment and are cut away opposite the driver's compartment to form a transversely extending passage 28. Thus it will be noted that the plates are substantially U-shaped in elevation with the legs of the U disposed upon opposite sides of the passage 28 to form side panels for the body, while the base of the U or connecting chord portions 29 for the legs aforesaid are disposed substantially below the sill members 23 and constitute supports for the floor panel 30 of the driver's compartment. This panel is formed at the opposite edges thereof with depending flanges 31 secured to the chord portions 29. Secured to the lower edge of the chord portions and to the floor panel is a suitable brace 32 having a portion 33 constituting a support for the platform or running board 34. Thus it will be noted that the chord portions 29 of the plates 27 in addition to supporting the floor panel 30 and platform 34, forms kick plates for the passage 28. The forward end of the driver's compartment in advance of the passage 28 is provided with a floor section comprising a panel 35 seated upon the top of the sill members and secured to a suitable panel 36 extending upwardly from and secured to the floor portion 30.

Figure 4:
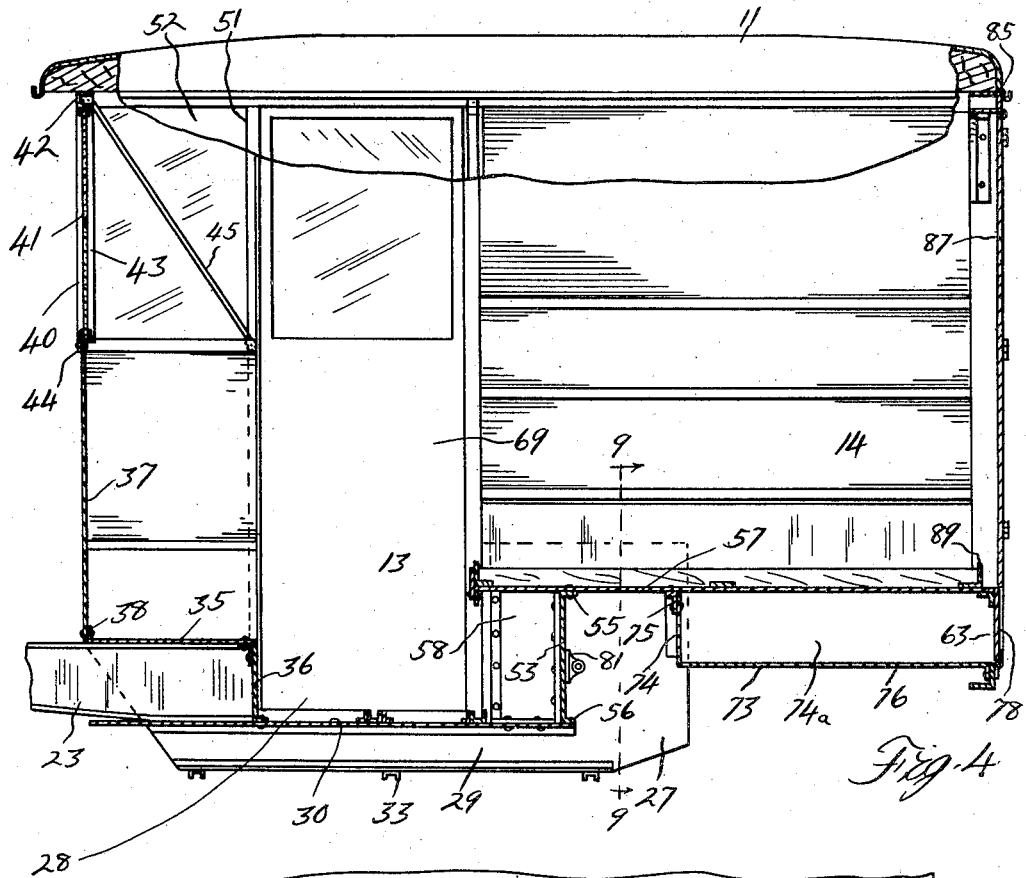
Figure 4 is a side elevation of the body with certain portions broken away for the sake of clearness.
Figure 5:
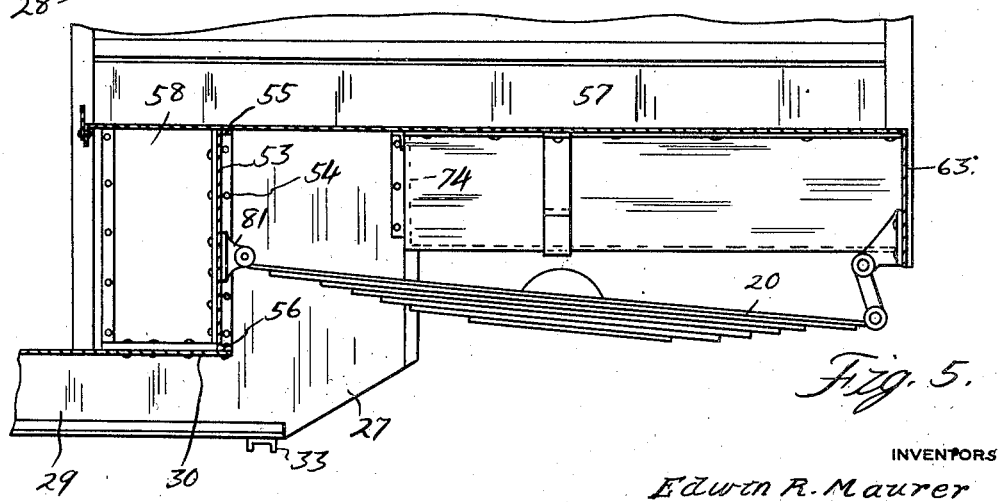
Figure 5 is a fragmentary sectional view through a portion of the body showing the mounting for the rear springs.

Extending transversely of the vehicle and establishing a tie between the forward end of the plates 27 is a dash plate 37 seated at the lower end upon the sill members 23 and secured to a flange 38 extending upwardly from the floor section 35. As shown particularly in Figures 2 and 4 of the drawings, the dash plate terminates short of the top 39 of the body to provide a space 40 for the windshield 41. The latter is of any suitable design and is preferably hingedly connected at the top thereof to a channel-shaped header 42 extending between then secured to the angle bars 43 and constituting a support for the top 39 to be more fully hereinafter referred to. The angle bars 43 together with the angle bar 44 secured to the top edge of the dash 37 form a frame for the windshield. The side bars 43 are suitably secured to a pair of upright angle bars 45 extending between the top 39 and floor panel 30 of the vehicle and have one side thereof secured to the plates 37 and 27 and the other side 46 extending in a plane parallel to but spaced outwardly from the forward end of the side plates 27 as clearly shown in Figure 6 of the drawings. Spaced rearwardly from the upright bars 45 and forming a front pillar for the passage 28, are the angle bars 47 secured at the lower ends thereof to the plates 27 and at the upper ends to a pair of inverted channel-shaped rails 48 extending longitudinally of the body at the opposite sides thereof. The bars 47 are so arranged that one side 49 thereof is disposed in substantially the same plane as the sides 46 of the bars 45. Secured to the inner surfaces of the sides 46 and 49, is a suitable veneer or finish panel 50. These panels also terminate short of the top 39 to provide openings 51 for receiving suitable glass panels 52.

For supporting the rear ends of the plates 27 we provide a brace 53 extending between and secured to the plates 27 by means of rivets 54. As shown, the plate 53 is provided at the top and bottom edges thereof with rearwardly extending flanges 55 and 56 respectively. The lower flange 56 is secured to the floor panel 30 at the rear edge thereof while the upper flange 55 is secured to a panel 57 which as shown, extends from the driver's compartment to the rear end of the vehicle and constitutes a floor for the storage chamber. In order to provide a rigid construction the braces 58 are provided having their forward ends secured to the plate 27 in rear of the passage 28 and having their rear ends secured to the plate 53 as clearly illustrated in Figure 6 of the drawings. The plates 58 extend from the floor portion 30 of the driver's compartment to the floor portion 57 of the storage compartment and forms a support for the forward edge of the floor panel 57.

Thus from the foregoing it will be noted that the flooring 57 for the storage chamber is supported at a substantially higher elevation than the flooring 30 for the driver's compartment. This arrangement not only permits the operator to stand substantially erect within the driver's compartment but also facilitates handling of the load within the storage chamber.

Each side of the storage compartment is formed by two laterally spaced panels 59 and 60. The inner panels 59 form a continuation of the plates 27 and are secured at the forward ends thereof to the upright members 61 which as shown are secured at the lower ends to the plates 27 adjacent the passage 28 and at the upper ends to the rails 48. The rear ends of the panels 59 are secured to the inner legs of a pair of forwardly opening channel-shaped uprights 62 positioned at the rear end of the body and secured at the lower ends to the back plate 63 and at the upper ends to the rails 48. The lower edges of the panels 59 as shown in Figure 8 of the drawing, are secured to flanges 64 extending upwardly from opposite side edges of the floor panel 57, while the upper edges of the panels 59 are secured to the inner legs 65 of the channel-shaped rail 48.

The outer finishing panels 60 are secured at the top edges thereof to the outer legs 66 of the channel-shaped rail 48 and at the forward edge to suitable uprights 67 secured to the plates 27 and rails 48. The rear edges of the panels are secured to the outer legs of the channel-shaped uprights 62 while the lower edges thereof are secured intermediate the ends to the fenders 67 and are provided with inturned flanges 68 at the forward ends thereof abutting the plates 27 and secured thereto. Slidably arranged in the space provided between the panels 59 and 60 are suitable closures or doors 69 for closing the driver's compartment. As shown in Figure 7 of the drawings the doors 69 are provided at the upper ends thereof with suitable rollers 70 adapted to engage track members 71 secured to the rails 48 within the channels thereof. In order to limit the rearward movement of the doors, suitable uprights 72 are disposed between the panels 59 and 60 in rear of the plates 27. These uprights in addition to forming an abutment for the doors, function to brace the panels.

Disposed beneath the floor panel 57 of the storage compartment is a suitable tire carrying chamber 73 formed of sheet metal and having the front wall 74 secured to a cross bar 75 extending between and secured to the plates 27. The side walls 74a of the chamber as shown in Figure 8 are secured to the floor 57 and to the end plate 63 while the bottom wall 76 is rigidly secured to the plate 63 adjacent the lower edge thereof. Access to the chamber is accompished through an elongated opening 77 formed in the plate 63 and normally closed by a suitable door 78. Thus it will be noted that inasmuch as the walls of the chamber are rigidly secured to the cross brace 75 and to the end plate 63 the same, in addition to carrying the tire will function as a brace for the rear end of the body. In order to provide a rigid construction, suitable brackets 79 are secured to the side walls 74 of the chamber 73 and to the floor panel 57. These brackets are provided with a base portion 80 constituting a bumper for limiting the upward movement of the rear springs 70. The forward ends of the springs 20 are mounted upon the cross plate 53 by means of the brackets 81 shown in Figure 6, while the rear ends of the springs 20 are suitable connected to the end plate 63. The front springs 19 are mounted upon the sill members 23 in the conventional manner.

The top for the vehicle is also formed of spaced inner and outer panels 82 and 83 respectively held in proper spaced relation by means of the marginal frame 84. The side portions of the latter rest upon and are secured to the base portions of the channel-shaped rails while the front and rear ends thereof preferably rest respectively upon the header 42 and a cross rail 85 which as shown extends between and is secured to the rear uprights 62. To further strengthen the top, suitable supporting brackets 86 are secured to the inner top panel 82 and to the rails 48.

The top set forth with some particularity in the above description in addition to forming the usual roof for the body, is so designed as to cooperate with the remaining parts of the body to support the load of the vehicle. In other words the various parts of the body are so assembled as to form in effect, a truss, the top assembly forming the upper chord member and the side plate assemblies 27 forming the lower chord members. The uprights 45, 47, 61, 67 and the cross braces 45' would serve to connect the lower body assembly to the top construction, function in effect as tension members of the truss and serve to brace the side plates 27 to prevent the same from buckling under loads. In other words the body is so constructed that the top of the vehicle serves as a reinforcement for the side plates 27 and cooperate with the same to support the load of the vehicle. With this construction the side plates 27 and associated parts hereof may be formed of relatively thin gauge metal with the result that the vehicle may be economically manufactured.

The rear end of the storage compartment is normally sealed by a pair of swing doors 87 hingedly connected to the uprights 62 and provided with a suitable latch mechanism 88. Inward movement of the doors being prevented by securing a suitable angle bracket 89 to the floor panel 57 at the rear end thereof.

Thus from the foregoing, it will be noted that we have provided a body for a delivery vehicle having double panelled side walls, the inner panel assembly being designed to carry substantially the entire load of the vehicle and the outer panel assembly designed to give the body a finished appearance and to cooperate with the inner panel assembly to insulate the interior of the body from the temperature of the surrounding atmosphere. An arrangement of the above character offers the possibility of eliminating complicated chassis frames for carrying the load of the body and renders possible the production of a commercially satisfactory construction which can be cheaply and durably manufactured and assembled. Furthermore with the above type of body it is possible for the operator to stand erect in the driver's compartment and handle the load in the storage compartment at substantially curb level.

What we claim as our invention is:

1. In a motor delivery vehicle, a combined body and chassis frame having door openings in opposite sides thereof, side plates forming an element of a truss for supporting the body and having portions of substantial width located upon opposite sides of the openings forming body panels and further having integral connecting portions extending across and below the door openings.

2. In a motor delivery vehicle, a combined body and chassis frame having door openings in opposite sides thereof, side plates having portions of substantial width located upon opposite sides of the openings forming body panels and having integral connecting portions extending below the openings, tie members connecting said plates and a top construction for said body also connected to said plates and cooperating with the latter to form a truss.

3. In a motor delivery vehicle, a combined body and chassis frame having door openings in opposite sides thereof, side plates having portions of substantial width located upon opposite sides of the openings forming body panels and having integral connecting portions extending below the openings, tie members connecting said plates and a top construction for said body also connected to said plates and cooperating with the latter to form a truss, and sub-sill members carried by and extending forwardly from said plates constituting a support for a motor.

In testimony whereof we affix our signatures.

EDWIN R. MAURER.
DONALD M. FERGUSON.